(12) United States Patent
Shiba

(10) Patent No.: US 9,075,133 B2
(45) Date of Patent: Jul. 7, 2015

(54) OBJECT DETECTION AND TRACKING SUPPORT SYSTEM, CONTROL METHOD, AND PROGRAM

(75) Inventor: Hisashi Shiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 516 days.

(21) Appl. No.: 13/421,474

(22) Filed: Mar. 15, 2012

(65) Prior Publication Data

US 2012/0242533 A1 Sep. 27, 2012

(30) Foreign Application Priority Data

Mar. 22, 2011 (JP) ................................. 2011-062109

(51) Int. Cl.
*G01S 15/00* (2006.01)
*G01S 7/40* (2006.01)
*G01S 7/52* (2006.01)
*G01S 13/00* (2006.01)

(52) U.S. Cl.
CPC ................. *G01S 15/003* (2013.01); *G01S 7/40* (2013.01); *G01S 7/52004* (2013.01); *G01S 13/003* (2013.01)

(58) Field of Classification Search
CPC ..... G01S 7/40; G01S 7/52004; G01S 15/003; G01S 13/003
See application file for complete search history.

(56) References Cited

U.S. PATENT DOCUMENTS

| | | | |
|---|---|---|---|
| 4,060,790 A | | 11/1977 | Raff |
| 5,031,157 A | * | 7/1991 | Anderson et al. ............. 367/110 |
| 5,237,541 A | * | 8/1993 | Woodsum ....................... 367/92 |
| 5,305,286 A | * | 4/1994 | Woodsum et al. ............. 367/92 |
| 6,466,891 B1 | * | 10/2002 | Carter et al. .................. 702/150 |
| 7,495,994 B2 | | 2/2009 | Makris et al. |
| 2005/0052948 A1 | | 3/2005 | Caulfield et al. |
| 2008/0165617 A1 | | 7/2008 | Abbot et al. |

FOREIGN PATENT DOCUMENTS

| | | |
|---|---|---|
| JP | 60159667 | 8/1985 |
| JP | 61271476 | 12/1986 |

(Continued)

OTHER PUBLICATIONS

European Search Report—EP 12 16 0073—Jul. 4, 2012.

(Continued)

*Primary Examiner* — Isam Alsomiri
*Assistant Examiner* — Hovhannes Baghdasaryan
(74) *Attorney, Agent, or Firm* — Young & Thompson

(57) ABSTRACT

An object detection and tracking support system includes a setting unit, a transmission level obtaining unit, a propagation loss function estimating unit that, based on various information relating to a transmitter and a receiver stored in the setting unit, calculates the propagation loss as a propagation loss function expressed as a function of the distance and the direction viewed from the receiver, a target strength obtaining unit that, in regard to an object of object information stored in the setting unit, extracts a target strength of the object from an external database; and a detection signal level function estimating unit that, based on transmission level information obtained by the transmission level obtaining unit, a propagation loss function calculated by the propagation loss coefficient estimating unit, and a target strength extracted by the target strength obtaining unit, determines a detection signal level function, for display on an external display unit.

8 Claims, 5 Drawing Sheets

(56) References Cited

FOREIGN PATENT DOCUMENTS

| JP | 08086866 | 4/1996 |
|---|---|---|
| JP | 10170638 | 6/1998 |
| JP | 2001289949 | 10/2001 |
| JP | 2008545991 | 12/2008 |

OTHER PUBLICATIONS

Henry Cox: "Fudamentals of Bistatic Active Sonar", Underwater Acoustic Data Processing, Jan. 1, 1989, pp. 3-22, XP55030757, Dordrecht, NL—Retrieved from the Internet: URL:http://books.google.de/books?id=tAP3zn0TtkkC&pg=PA3&lpg=PA3&dq=%22Fundamentals+of+Bistatic+Active+Sonar%22&source=bl&ots=DWAccrAJqo&sig=RU8lo8EaZeOGMdhPHS_zU-hWx_E&hl=de&sa=X&ei=fbvpT6nEB-TQ4QSLs-ilDg&ved=0CEgQ6AEwAA#v=onepage&q=%22Fundamentals%20of%20Bistatic%20Active%20Sonar%22&f=false.

R Seegal et al: "On Sonar Performance Estimation for Separated Source and Receiver", Jun. 1, 1996, XP55031097, Navy Electronics Laboratory San Diego Retrieved from the Internet: URL:http://www.dtic.mil/cgi-bin/GetTRDoc?Location=U2&doc=GetTRDoc.pdf&AD=ADA068956 [retrieved on Jun. 26, 2012] *the whole document*.

Seizando Shoten—Marine Acoustics Basics and Applications, Edition of Marine Acoustics Society of Japan—May 2004—pp. 1-7.

Japanese Office Action, dated Nov. 4, 2014, in corresponding Japanese Patent Application No. 2011-062109.

* cited by examiner

OBJECT DETECTION AND TRACKING SUPPORT SYSTEM, CONTROL METHOD, AND PROGRAM

CROSS REFERENCE TO RELATED APPLICATIONS

Priority is claimed on Japanese Patent Application No. 2011-062109, filed Mar. 22, 2011, the content of which is incorporated herein by reference.

BACKGROUND OF THE INVENTION

1. Field of the Invention

The present invention relates to an object detection and tracking support system, a control method, and a program thereof. The invention particularly relates to an object detection and tracking support system that supports the detection of objects using detection waves generated from a transmitter, a control method for controlling the object detection and tracking support system, and a program for the object detection and tracking support system.

2. Description of Related Art

A sonar system, a radar system, and a lidar system detect and track objects using, respectively, sound waves, radio waves, and light waves. These kinds of system can increase the reliability of detection and provide a detection threshold by estimating the signal level from an object beforehand.

A detection signal level DL, in the case of a monostatic active sonar, can be expressed using the transmission level SL, the propagation loss TL, and the target strength TS, as DL=SL−2TL+TS, which is mentioned, for example, in 'Marine Acoustics: Basics and Applications,' Edition of Marine Acoustics Society of Japan, published by Seizando Shoten, May 2004 (Non-patent publication 1) p. 29. The transmission level SL is specified on the transmission side, and can easily be ascertained beforehand. The TS is different for each object, and can be ascertained by measuring it beforehand. In reality, however, it is often extremely difficult to measure the TS of the object in advance, and an estimate is therefore made using mathematical calculation and the like based on the supposed material, shape, and size of the object. The TL can be ascertained by actual measurement. While it is not feasible to measure the TL at every point. Propagation loss in the ocean is large due to spreading loss. The TL can be expressed in a mathematical formula as cylindrical spreading in shallow waters and spherical spreading in deep waters. By measuring the TL at a specific point, the TL at various places can be estimated based on a propagation loss equation. Incidentally, spherical spreading and cylindrical spreading are sometimes referred to as spherical dispersion and cylindrical dispersion. In this manner, it is possible to estimate the detection signal level at various points.

In a detecting and tracking device with a monostatic configuration, a transmitter and a receiver are provided at the same position. Therefore, propagation loss can simply be expressed as a function of the distance, irrespective of the direction.

In contrast, in a detecting and tracking device with a multistatic configuration, the transmitter and the receiver are provided at different positions. Consequently, the propagation distance from the transmitter differs depending on the direction of the object, even if the distance of the object from the receiver is identical. The propagation loss is therefore different in each direction. However, propagation loss that differs in each direction is expressed by a formula that includes both the distance and the direction viewed from the transmitter.

A region where the propagation loss becomes identical when viewed from the receiver is calculated from a numerical calculation that is complicated and requires high calculation capability, such as the FDTD shown in the Non-patent publication 1, p. 88. Thus, in a multistatic configuration, estimating the transmission level from an object viewed from the receiver is complicated and requires a considerable calculation load.

SUMMARY OF THE INVENTION

Therefore, an object of the present invention is to provide an object detection and tracking support system, a control method, and a program thereof. To achieve an object described above, an object detection and tracking support system in accordance with an exemplary embodiment of the present invention, which supports the detection of objects using detection waves generated from a transmitter, includes: a setting unit configured to store transmission level information set at the transmitter, object information of the object, and positional information of the transmitter and a receiver, a transmission level obtaining unit configured to obtain transmission level information stored in the setting unit, a propagation loss function estimating unit configured to, based on positional information of the transmitter and the receiver stored in the setting unit, calculate the propagation loss as a propagation loss function expressed as a function of the distance and the direction viewed from the receiver, a target strength obtaining unit configured to, in regard to an object of object information stored in the setting unit, extract a target strength of the object from an external database, and a detection signal level function estimating unit configured to, based on the transmission level information obtained by the transmission level obtaining unit, the propagation loss function calculated by the propagation loss coefficient estimating unit, and the target strength extracted by the target strength obtaining unit, determine a detection signal level function that expresses the signal level as a function of the distance and the direction from the receiver, and makes an external display unit display the detection signal level function.

In accordance with another exemplary embodiment of the present invention, a control method for controlling an object detection and tracking support system that supports the detection of objects using detection waves generated from a transmitter, includes: a setting step of storing transmission level information set at the transmitter, object information of the object, and positional information of the transmitter and a receiver, a transmission level obtaining step of obtaining transmission level information stored in the setting step, a propagation loss function estimating step of, based on positional information of the transmitter and the receiver stored in the setting step, calculating the propagation loss as a propagation loss function expressed as a function of the distance and the direction viewed from the receiver, a target strength obtaining step of, in regard to an object of object information stored in the setting unit, extracting a target strength of the object from an external database, and a detection signal level function estimating step of, based on the transmission level information obtained in the transmission level obtaining step, the propagation loss function calculated in the propagation loss coefficient estimating step, and the target strength extracted in the target strength obtaining step, determining a detection signal level function that expresses the signal level as a function of the distance and the direction from the receiver, and making an external display unit display the detection signal level function.

In accordance with another exemplary embodiment of the present invention, a computer-readable recording medium recording a program for an object detection and tracking support system that supports detection of objects using detection waves generated from a transmitter, when being executed, the program making the object detection and tracking support system function as: a setting unit configured to store transmission level information set at the transmitter, object information of the object, and positional information of the transmitter and a receiver, a transmission level obtaining unit configured to obtain transmission level information stored in the setting unit, a propagation loss function estimating unit configured to, based on positional information of the transmitter and the receiver stored in the setting unit, calculate the propagation loss as a propagation loss function expressed as a function of the distance and the direction viewed from the receiver, a target strength obtaining unit configured to, in regard to an object of object information stored in the setting unit, extract a target strength of the object from an external database, and a detection signal level function estimating unit configured to, based on the transmission level information obtained by the transmission level obtaining unit, the propagation loss function calculated by the propagation loss coefficient estimating unit, and the target strength extracted by the target strength obtaining unit, determine a detection signal level function that expresses the signal level as a function of the distance and the direction from the receiver, and makes an external display unit display the detection signal level function.

The above description of the invention does not enumerate all the necessary characteristics of the invention, and subcombinations of these characteristics also constitute inventions in their own right.

As clearly shown by the above description, the invention enables a device with a multistatic configuration that detects and tracks an object, such as a sonar system, a radar system, or a lidar system, to easily estimate the signal level from the object.

DETAILED DESCRIPTION OF THE INVENTION

While the present invention will now be explained by way of preferred embodiments, these are not limitative of the invention according to the patent claims, and the combinations of characteristics described in the embodiments are not all essential for implementing the invention.

Figure 1:
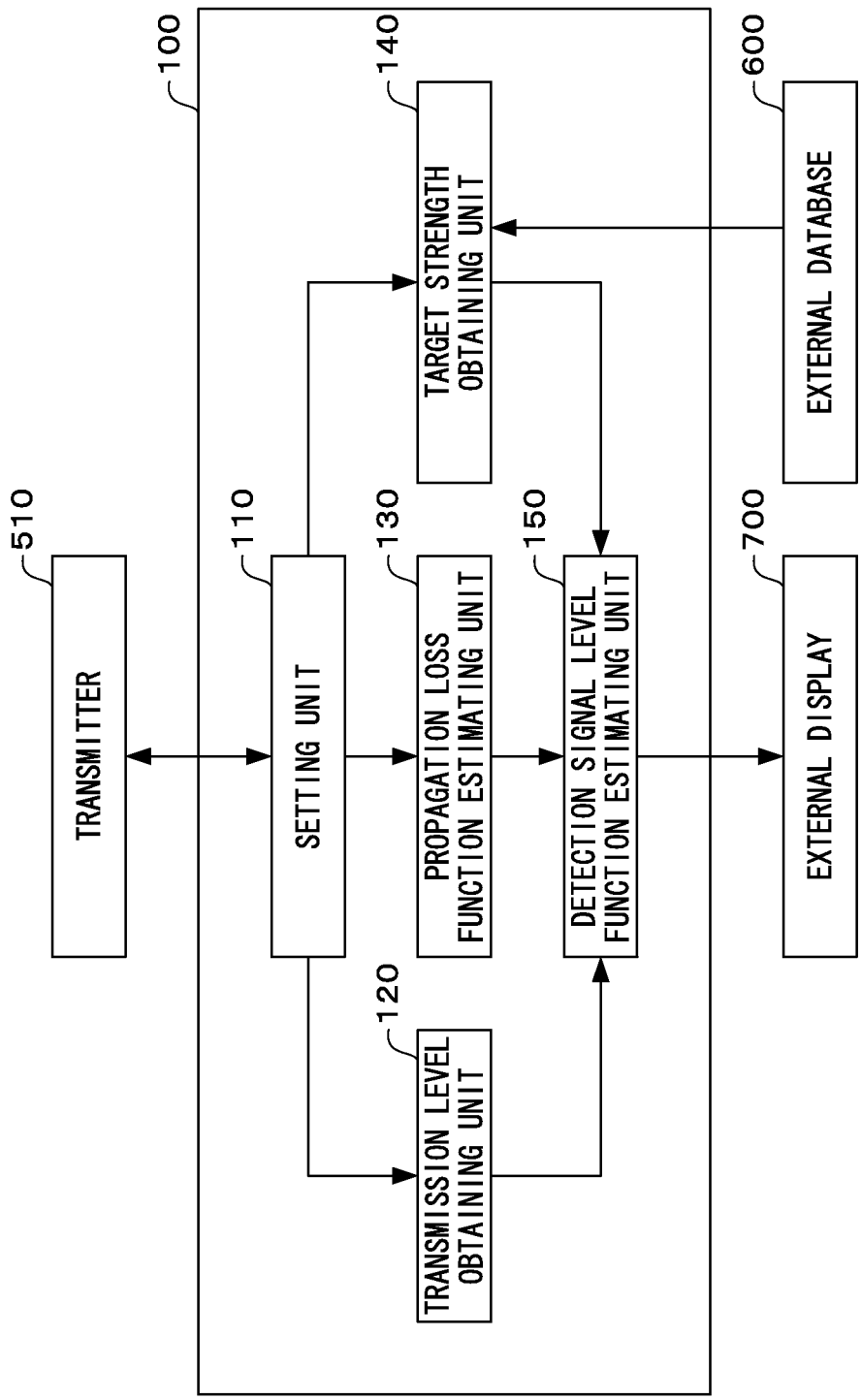
FIG. 1 is a block diagram showing an example of a usage environment of an object detection support device according to a first embodiment.
Figure 4:
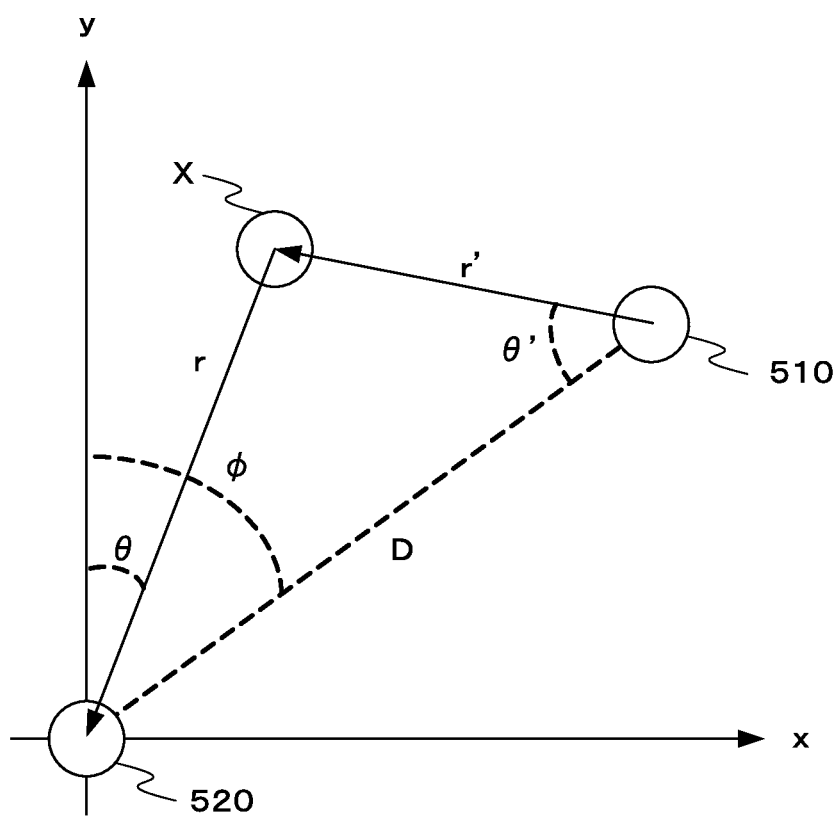
FIG. 4 is a graph showing an example of a positional relationship between a transmitter, a receiver, and an object.

FIG. 1 is an example of a usage environment of an object detection support device 100 according to a first embodiment. FIG. 4 is an example of a positional relationship between a transmitter 510, a receiver 520, and an object X. The object detection support device 100 supports the detection of the object X by detected waves generated from the transmitter 510. The transmitter 510 is one part of a device that detects and tracks the object X, such as a sonar system, a radar system, or a lidar system. A sonar system uses underwater sound to search, detect, and range an object X in the water, such as ships and submarines. A radar system transmits electromagnetic waves toward a target object and measures the reflected waves, thereby clarifying the distance to the target object and its direction. A lidar system is a type of remote sensing technology using light; a lidar system measures scattered light of a target which laser pulse is irradiated, and analyzes the distance to a distant target and the quality of that target. The object detection support device 100 can be an example of an object detection and tracking support system in accordance with the present invention.

The object detection support device 100 includes a setting unit 110, a transmission level obtaining unit 120, a propagation loss function estimating unit 130, a target strength obtaining unit 140, and a detection signal level function estimating unit 150.

The setting unit 110 performs operations such as obtaining a transmission level set at the transmitter 510 and obtaining a transmission level for the transmitter 510 specified by a user, and stores them. The setting unit 110 also stores information such as the type and name of the object X specified by the user.

The setting unit 110 also stores positional information of the transmitter 510 and the receiver 520 specified by the user.

The transmission level obtaining unit 120 obtains a transmission level set in the setting unit 110.

Based on the position of the transmitter 510 and the position of the receiver 520 set in the setting unit 110, the propagation loss function estimating unit 130 determines a propagation loss function which is as a function of the distance and the direction viewed from the receiver 520. For example, when the receiver 520, the transmitter 510, and the object X are arranged as shown in FIG. 4, D: distance between the transmitter 510 and the receiver 520, r: distance from the receiver 520 to the object X, r': distance from the transmitter 510 to the object X, θ: the direction of the object X viewed from the receiver 520, φ: the direction of the transmitter 510 viewed from the receiver 520, θ': the angle between the direction of the object X and the direction of the receiver 520 viewed from the transmitter 510, and the propagation loss function is as a function of D, r, r', θ, φ, and θ'. For example, when the propagation loss is due to spherical spreading, the propagation loss function TL is expressed with Equation (1).

$$TL = 20 \log r + 10 \log \{r^2 - 2Dr \cos(\phi - \theta) + D^2\} \quad (1)$$

For example, when the propagation loss is due to cylindrical spreading, the propagation loss function TL is expressed in Equation (2).

$$TL = 10 \log r + 5 \log \{r^2 - 2Dr \cos(\phi - \theta) + D^2\} \quad (2)$$

For example, when the propagation loss is due to cylindrical spreading from the transmitter 510 to the object X, and spherical spreading loss from the object X to the receiver 520, the propagation loss function TL is expressed in Equation (3).

$$TL = 20 \log r + 5 \log \{r^2 - 2Dr \cos(\phi - \theta) + D^2\} \quad (3)$$

For example, when the propagation loss is due to spherical spreading loss from the transmitter 510 to the object X, and cylindrical spreading from the object X to the receiver 520, the propagation loss function TL is expressed in Equation (4).

$$TL = 10 \log r + 10 \log \{r'^2 - 2Dr \cos(\phi-\theta) + D^2\} \quad (4)$$

For example, when the propagation loss is due to absorption loss, and a is the absorption coefficient, this gives Equation (5)

$$TL = \alpha r + \alpha \sqrt{r'^2 - 2Dr\cos(\phi-\theta) + D^2} \quad (5)$$

In these cases, there is no need to specify the distance r' from the transmitter 510 to the object X, nor is there any need to specify the angle θ' between the direction of the object X and the direction of the receiver 520 viewed from the transmitter 510.

When the spreading loss and the absorption loss are equally influential, the total of their propagation loss functions can serve as the propagation loss function. As a reference for determining whether their influence is equal, for example, the question of whether one does not exceed ten times of the other can be used.

Moreover, the propagation loss function can be one where spreading loss is spherical spreading up to a specific distance, and is thereafter cylindrical spreading. In that case, the spherical spreading part becomes a constant after the specific distance.

In addition, a propagation loss anomaly A can be added to these propagation loss functions, as in Equation (6), to obtain the propagation loss function.

$$TL' = TL + A \quad (6)$$

In regard to the object X set in the setting unit 110, the target strength obtaining unit 140 extracts the target strength of the object X from an external database 600. In extracting the target strength of the object X from the external database 600, for example, it can use a computer program to automatically generate a database language SQL and transmit this to the external database 600.

The external database 600 includes, for example, a computer and a display, and can be constructed using commercial standard database software. The database has the functions of, for example, outputting a target strength when the name of an object X is input, displaying a list of names of stored objects X, storing new information relating to the object X, correcting the target strength of the object X, and deleting the information of an object X. These functions can easily be realized using commercial standard database software. The user prepares the data to be stored beforehand.

From the transmission level, the propagation loss function, and the target strength, the detection signal level function estimating unit 150 determines a detection signal level function that expresses the signal level as a function of the distance and the direction from the receiver 520, and makes an external display 700 display the detection signal level function. For example, in the case of a multistatic active sonar, if SL is the transmission level, TL is the propagation loss function for the receiver like equations (1)-(5), and TS is the target strength, the detection signal level function DL is expressed with Equation (7).

$$DL = SL - TL + TS \quad (7)$$

The external display 700, for example, displays the detection signal level function that was obtained as a mathematical formula, or, for example, displays it on a three-dimensional graph where coordinates are represented in the xy plane and the detection signal level is shown in the z-axis direction, or displays a direction specified by the user in a graph where the horizontal axis represents distance and the vertical axis represents the detection signal level.

Figure 2:
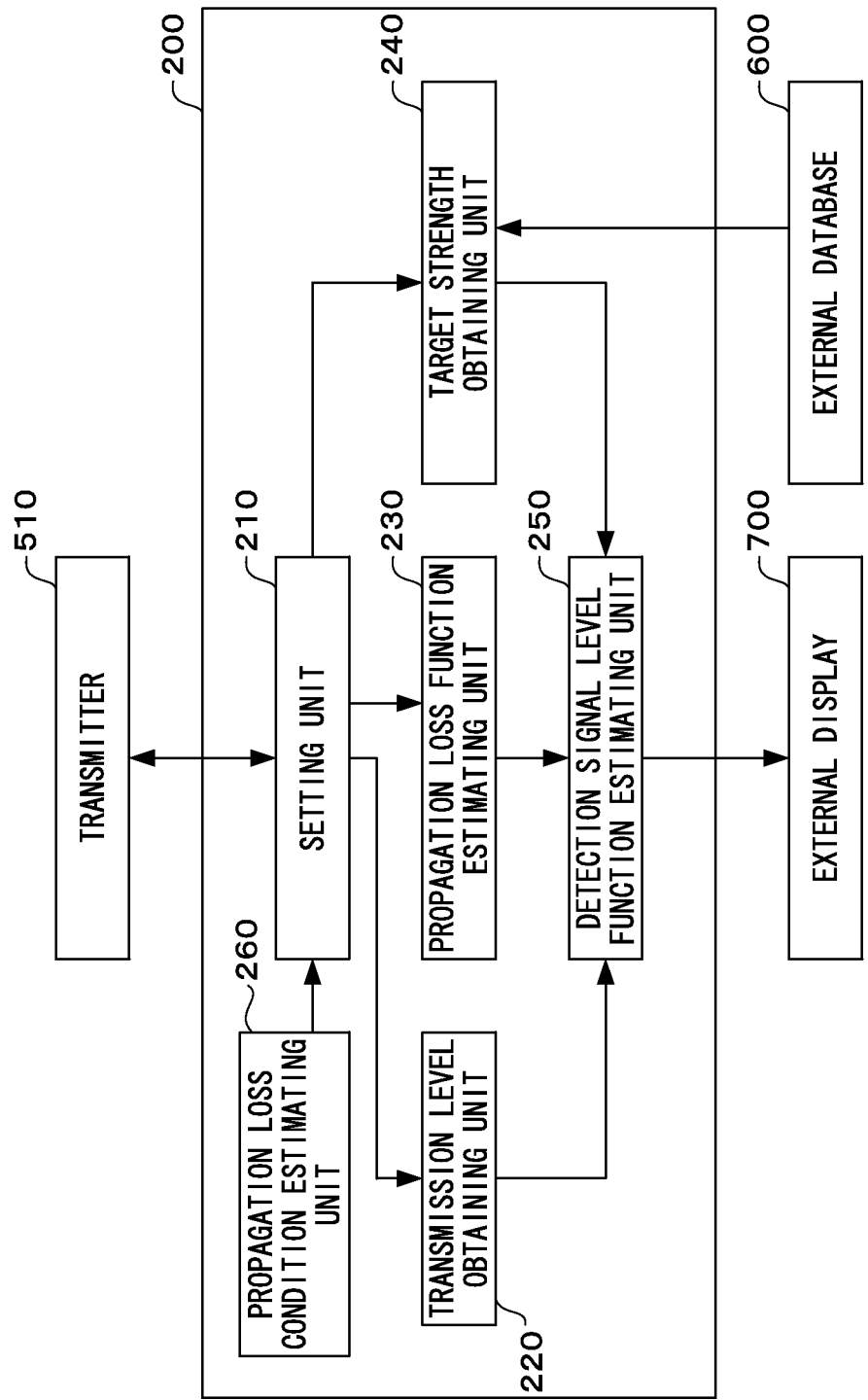
FIG. 2 is a block diagram showing an example of a usage environment of an object detection support device according to a second embodiment.

FIG. 2 is an example of a usage environment of an object detection support device 200 according to a second embodiment. In the second embodiment, a propagation loss condition estimating unit 260 is added to the first embodiment. The other sections are the same as those of the first embodiment.

The propagation loss condition estimating unit 260 determines propagation loss functions for both spreading loss and absorption loss by use of an anticipated position of the object X, the position of the transmitter 510, the position of the receiver 520, and also the absorption coefficient, and then selects the one that is more influential, i.e. the one with the higher propagation loss value. When they are similarly influential, the propagation loss function can be the total of the two propagation loss functions. As a reference for determining whether to select spreading loss or absorption loss, for example, if one is ten times the other, then that one is selected, and otherwise the total of the two is calculated.

In spreading loss, the reference for selecting spherical spreading or cylindrical spreading can be, for example, in active sonar, if the anticipated distance to the object X is greater than the ocean depth, cylindrical spreading is selected, whereas, if the distance is equal to or less than the ocean depth, spherical spreading is selected.

Figure 3:
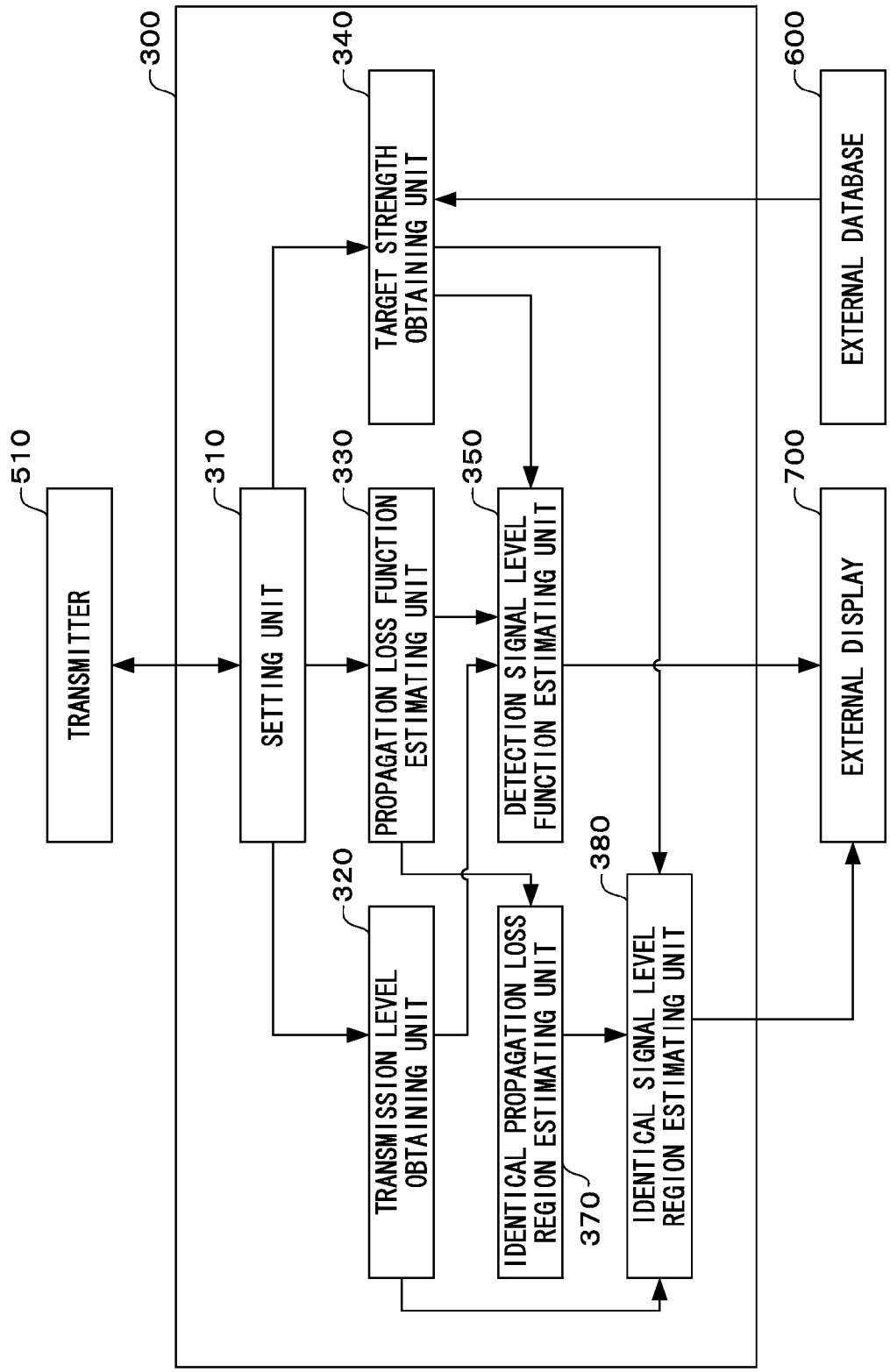
FIG. 3 is a block diagram showing an example of a usage environment of an object detection support device according to a third embodiment.

FIG. 3 is an example of a usage environment of an object detection support device 300 according to a third embodiment. In the third embodiment, an identical propagation loss region estimating unit 370 and an identical signal level region estimating unit 380 are added to the first embodiment described in FIG. 1.

The identical propagation loss region estimating unit 370 determines a function that expresses a region that attains a specified propagation loss value using the distance and the direction when viewed from a receiver 520. Here, a description will be given with reference to the relationship of the positions among the object X, the position of the transmitter 510, and the position of the receiver 520 shown in FIG. 4.

When, for example, the propagation loss is due to spherical spreading, an identical propagation loss region where the propagation loss becomes C is expressed by solving r in Equation (8). Here, r can be written as an N-th degree polynomial equation, where N is an integer. The Equation (8) is a quartic equation of r (or fourth-degree equation of r), and can be solved using, for example, the well-known Ferrari method.

$$r^4 - 2Dr^3 \cos(\phi-\theta) + D^2 r^2 = 10^{C/10} \quad (8)$$

When, for example, the propagation loss is due to cylindrical spreading, an identical propagation loss region where the propagation loss becomes C is expressed by solving r in Equation (9). As above, this can be solved using the Ferrari method or the like.

$$r^4 - 2Dr^3 \cos(\phi-\theta) + D^2 r^2 = 10^{C/5} \quad (9)$$

When, for example, the propagation loss from the transmitter 510 to the object X is due to cylindrical spreading, and the propagation loss from the object X to the receiver 520 is due to spherical spreading, an identical propagation loss region where the propagation loss becomes C is expressed by solving r in Equation (10). Here, the equation (10) is a sextic equation of r (or sixth-degree equation of r), for which there is no conventional analytical solution. An approximate solution can be determined by using, for example, the well-known Newton method.

$$r^6 - 2Dr^5 \cos(\phi-\theta) + D^2 r^4 = 10^{C/5} \quad (10)$$

When, for example, the propagation loss from the transmitter 510 to the object X is due to spherical spreading, and the propagation loss from the object X to the receiver 520 is due to cylindrical spreading, an identical propagation loss region where the propagation loss becomes C is expressed by solving r in Equation (11). Here, r is a third-degree equation, which can be solved by using, for example, the well-known Lagrange method.

$$r^3 - 2Dr^2 \cos(\phi - \theta) + D^2 r = 10^{C/10} \quad (11)$$

When, for example, the propagation loss is due to absorption loss, if a is the absorption coefficient, an identical propagation loss region where the propagation loss becomes C is expressed with Equation (12).

$$r = \frac{\left(\frac{C}{\alpha}\right)^2 - D^2}{2\left\{\frac{C}{\alpha} - D\cos(\phi - \theta)\right\}} \quad (12)$$

In the case of other propagation loss conditions, an identical propagation loss region can be determined by using a propagation loss function to make an equation for r when the propagation loss is constant, and then solving by r.

The identical signal level region estimating unit determines an identical signal level region by adding a transmission level and a target tolerance to the identical propagation loss region.

Incidentally, the third embodiment described here is merely an example, and the identical propagation loss region estimating unit 370 and the identical signal level region estimating unit 380 can also be added to the second embodiment.

An effect of the present invention is that it enables a device with a multistatic configuration such as a sonar system, a radar system, or a lidar system that detects and tracks an object X, to easily estimate the signal level from the object X.

The reason for this is that the propagation loss is determined as a propagation loss function, which is as a function of the distance and the direction from the receiver 520, and, using the propagation loss function that was obtained, the transmission level, and the target tolerance, the signal level from the object X is determined as a detection signal level function, which is as a function of the distance and the direction. The propagation loss can be expressed in a simultaneous equation based on the distance and the direction from the receiver 520, and by solving that simultaneous equation beforehand, the propagation loss can be determined as a propagation loss function, which is as a function of the distance and the direction.

Furthermore, the detectability of the object X can be assessed by expressing a region where the signal level from the object X becomes equal.

The reason for this is that, when using a propagation loss function from the receiver 520, it becomes possible to express a region that becomes identical to a specified propagation loss as a function of the direction and the distance from the receiver 520.

Figure 5:
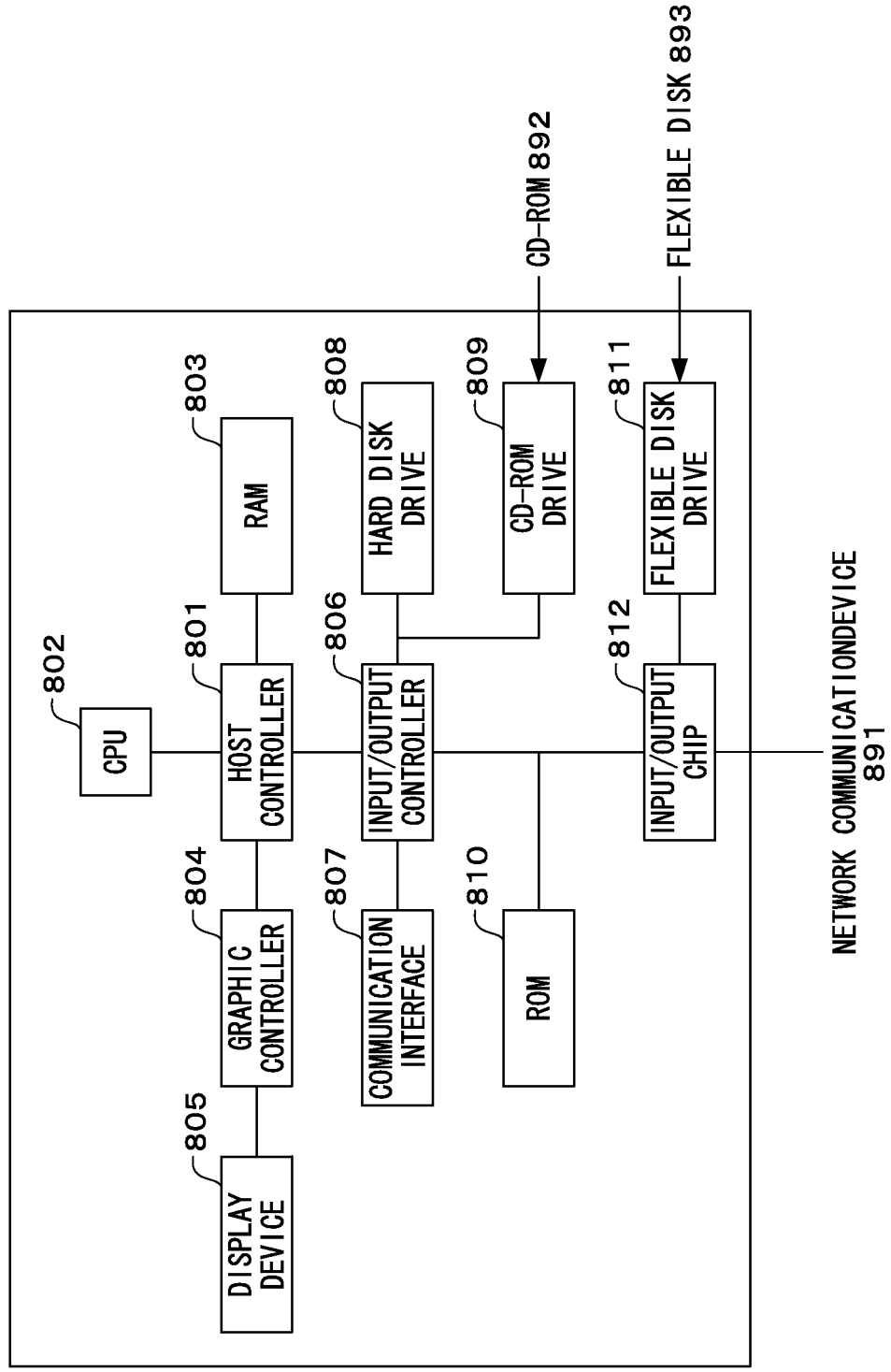
FIG. 5 is a block diagram showing an example of a hardware configuration when the object detection support device is configured from an electronic data processing system such as a computer.

FIG. 5 is an example of a hardware configuration when the object detection support devices 100, 200, and 300 are configured from an electronic data processing system such as a computer. The object detection support devices 100, 200, and 300 include a central processing unit (CPU) peripheral unit, an input/output unit, and a legacy input/output unit. The CPU peripheral unit includes a CPU 802, a random access memory (RAM) 803, a graphic controller 804, and a display device 805, which are connected to each other via a host controller 801. The input/output unit includes a communication interface 807, a hard disk drive 808, and a compact disk read only memory (CD-ROM) drive 809, which are connected via an input/output controller 806. The legacy input/output unit includes a read only memory (ROM) 810 and a flexible disk drive 811, and an input/output chip 812, which are connected to the input/output controller 806.

The host controller 801 connects the RAM 803, the CPU 802 that accesses the RAM 803 at a high transfer rate, and the graphic controller 804. The CPU 802 operates on the basis of programs stored in the ROM 810 and the RAM 803, and controls all the units. The graphic controller 804 obtains image data generated on a frame buffer that has been provided in the RAM 803 by the CPU 802 and the like, and makes the display device 805 display it. Alternatively, the graphic controller 804 could contain a frame buffer for storing image data generated by the CPU 802 and the like.

The input/output controller 806 connects the host controller 801, the hard disk drive 808 which is a comparatively high-speed input/output device, the communication interface 807, and the CD-ROM drive 809. The hard disk drive 808 stores programs and data used by the CPU 802. The communication interface 807 connects to a network communication device 891 to transmit and receive programs and data. The CD-ROM drive 809 reads programs and data from a CD-ROM 892, and supplies them via the RAM 803 to the hard disk drive 808 and the communication interface 807.

The ROM 810, and comparatively low-speed input/output devices, namely a flexible disk drive 811 and an input/output chip 812, are connected to the input/output controller 806. The ROM 810 stores a boot program executed when the object detection support devices 100, 200, and 300 are activated, or programs that depend on the hardware of the object detection support devices 100, 200, and 300, or the like. The flexible disk drive 811 reads programs and data from a flexible disk 893, and supplies them via the RAM 803 to the hard disk drive 808 and the communication interface 807. The input/output chip 812 connects various input/output devices via the flexible disk drive 811, or via a parallel port, a serial port, a keyboard port, a mouse port, etc.

The programs executed by the CPU 802 are stored in the flexible disk 893, the CD-ROM 892, or in a recording medium such as an integrated circuit (IC) card, and are supplied by a user. A program stored in the recording medium can be compressed or not compressed. The program is installed from the recording medium to the hard disk drive 808, read by the RAM 803, and executed by the CPU 802. The program executed by the CPU 802 makes the object detection support device 100 function as the setting unit 110, the transmission level obtaining unit 120, the propagation loss function estimating unit 130, the target strength obtaining unit 140, and the detection signal level function estimating unit 150 described in FIGS. 1 to 4, makes the object detection support device 200 function as the setting unit 210, the transmission level obtaining unit 220, the propagation loss function estimating unit 230, the target strength obtaining unit 240, the detection signal level function estimating unit 250, and the propagation loss condition estimating unit 260 described in FIGS. 1 to 4, and makes the object detection support device 300 function as the setting unit 310, the transmission level obtaining unit 320, the propagation loss function estimating unit 330, the target strength obtaining unit 340, the detection signal level function estimating unit 350, the identical propagation loss region estimating unit 370, and the identical signal level region estimating unit 380 described in FIGS. 1 to 4.

The programs described above can be stored in an external recording medium. As the recording medium, in addition to the flexible disk 893 and the CD-ROM 892, it is possible to use an optical recording medium such as a digital versatile disk (DVD), a Blu-ray disc and a phase disk (PD), a magnetooptical recording medium such as a minidisk (MD), a tape medium, a semiconductor memory such as an IC card and a flash memory, etc. It is also possible to use a recording medium such as an RAM and a hard disk provided in a server system connected to the Internet or a special communication network as the recording medium, and to supply the programs via this network.

While preferred embodiments of the invention have been described and illustrated above, these are exemplary of the invention and are not to be considered as limiting. It will be clear to a person skilled in the art that various modifications and improvements can be made to the embodiments described above. It will be clear from the scope of the appended claims that embodiments including such modifications and improvements can be contained within the technological scope of the present invention.

What is claimed is:

1. An object detection and tracking support system that supports detection of an object using detection waves generated from a transmitter, comprising:
    a setting unit configured to store transmission level information set at said transmitter, object information of said object, and positional information of said transmitter and a receiver, the setting unit additionally configured to store one or a plurality of anticipated propagation loss values specified by a user;
    a transmission level obtaining unit configured to obtain transmission level information stored in said setting unit;
    a propagation loss function estimating unit configured to, based on positional information of said transmitter and said receiver stored in said setting unit, calculate the propagation loss as a propagation loss function expressed as a function of the distance and the direction viewed from said receiver;
    a target strength obtaining unit configured to, in regard to an object of object information stored in said setting unit, extract a target strength of the object from an external database;
    a propagation loss region estimating unit configured to, from the propagation loss function obtained by said propagation loss function estimating unit and the propagation loss value stored in said setting unit, calculate a direction and distance at which the propagation loss value is constant as a propagation loss region;
    a signal level region estimating unit configured to, based on the propagation loss region calculated by said propagation loss region estimating unit, the transmission level information obtained by said transmission level obtaining unit, and the target strength extracted by said target strength obtaining unit, calculate a region where the signal level from the object is constant as a signal level region, and makes an external display unit display the signal level region; and
    a detection signal level function estimating unit configured to, based on the transmission level information obtained by said transmission level obtaining unit, the propagation loss function calculated by said propagation loss estimating unit, and the target strength extracted by said target strength obtaining unit, determine a detection signal level function that expresses the signal level as a function of the distance and the direction from said receiver, and makes the external display unit display the detection signal level function used to assess detectability of the object,
    wherein said propagation loss region estimating unit expresses the propagation loss region as the solution to an N-degree polynomial equation of the distance from said receiver to the object.

2. The object detection and tracking support system according to claim 1, wherein:
    said setting unit further stores information indicating whether the propagation loss is due to spreading loss or absorption loss or a mixture of both, and information indicating whether the spreading loss is due to spherical spreading or cylindrical spreading or a mixture of both, as propagation loss conditions; and
    said propagation loss function estimating unit calculates a propagation loss function based on the propagation loss conditions stored in said setting unit.

3. The object detection and tracking support system according to claim 2, further comprising a propagation loss condition estimating unit configured to determine whether the propagation loss is due to spreading loss or absorption loss or a mixture of both, and whether the spreading loss is due to spherical spreading or cylindrical spreading or a mixture of both, based on the positions of said transmitter and said receiver, an anticipated position of an object, topographical information relating to seabed topography, and a state of a medium of seawater, wherein
    said setting unit stores information indicating a determination result determined by said propagation loss condition estimating unit as a propagation loss condition.

4. The object detection and tracking support system according to claim 1, wherein the transmitter is directly connected to the object detection and tracking support system, and
    the setting unit is configured to directly receive the transmission level information from the transmitter that is set at the transmitter.

5. The object detection and tracking support system according to claim 1, wherein the propagation loss is calculated as the propagation loss function expressed as a function of the distance of the object and the distance of the transmitter from the receiver, and the direction of the object and the direction of the transmitter viewed from the receiver.

6. A control method for controlling an object detection and tracking support system that supports the detection of an object using detection waves generated from a transmitter, comprising:
    a setting step of storing transmission level information set at said transmitter, object information of said object, and positional information of said transmitter and a receiver, the setting step including storing one or a plurality of anticipated propagation loss values specified by a user;
    a transmission level obtaining step of obtaining transmission level information stored in said setting step;
    a propagation loss function estimating step of, based on positional information of said transmitter and said receiver stored in said setting step, calculating the propagation loss as a propagation loss function expressed as a function of the distance and the direction viewed from said receiver;
    a target strength obtaining step of, in regard to an object of object information stored in said setting unit, extracting a target strength of the object from an external database;
    a propagation loss region estimating step of, from the propagation loss function obtained by said propagation loss function estimating unit and the propagation loss value stored in said setting unit, calculating a direction and distance at which the propagation loss value is constant as a propagation loss region;

a signal level region estimating step of, based on the propagation loss region calculated by said propagation loss region estimating unit, the transmission level information obtained by said transmission level obtaining unit, and the target strength extracted by said target strength obtaining unit, calculating a region where the signal level from the object is constant as a signal level region, and making an external display unit display the signal level region; and a detection signal level function estimating step of, based on the transmission level information obtained in said transmission level obtaining step, the propagation loss function calculated in said propagation loss coefficient estimating step, and the target strength extracted in said target strength obtaining step, determining a detection signal level function that expresses the signal level as a function of the distance and the direction from said receiver, and making the external display unit display the detection signal level function used to assess the detectability of the object, wherein said propagation loss region estimating step expresses the propagation loss region as the solution to an N-degree polynomial equation of the distance from said receiver to the object.

7. The control method according to claim 6, wherein the transmitter is directly connected to the object detection and tracking support system, further comprising directly receiving, at the setting unit from the transmitter, the transmission level information that is set at the transmitter.

8. An object detection and tracking support system that supports detection of an object using detection waves generated from a transmitter, comprising:

a setting unit configured to store transmission level information set at said transmitter, object information of said object, and positional information of said transmitter and a receiver;

a transmission level obtaining unit configured to obtain transmission level information stored in said setting unit;

a propagation loss function estimating unit configured to, based on positional information of said transmitter and said receiver stored in said setting unit, calculate the propagation loss as a propagation loss function expressed as a function of the distance and the direction viewed from said receiver;

a target strength obtaining unit configured to, in regard to an object of object information stored in said setting unit, extract a target strength of the object from an external database; and a detection signal level function estimating unit configured to, based on the transmission level information obtained by said transmission level obtaining unit, the propagation loss function calculated by said propagation loss estimating unit, and the target strength extracted by said target strength obtaining unit, determine a detection signal level function that expresses the signal level as a function of the distance and the direction from said receiver, and makes an external display unit display the detection signal level function used to assess detectability of the object, wherein the propagation loss function is calculated using the term $r^2 - 2Dr \cos(\phi - \theta) + D^2$, where r is the distance from the receiver to the object, D is the distance between the transmitter and the receiver, $\theta$ is the direction of the object viewed from the receiver, and $\phi$ is the direction of the transmitter viewed from the receiver.

* * * * *